United States Patent [19]

Rowton

[11] 4,395,338
[45] Jul. 26, 1983

[54] METHOD AND SYSTEM FOR DEWATERING RESERVE PITS

[76] Inventor: Billy L. Rowton, Rte. 3, Box 65, Marlow, Okla. 73055

[21] Appl. No.: 367,415

[22] Filed: Apr. 12, 1982

[51] Int. Cl.³ .......................... C02F 1/04; E21B 21/06
[52] U.S. Cl. .................................... 210/747; 210/774; 210/180; 210/182; 210/197; 210/806; 210/901; 175/66
[58] Field of Search ............... 210/170, 747, 901, 180, 210/181, 774, 770, 771, 806, 182, 197; 405/128, 129, 267; 175/66, 206; 159/47.3

[56] References Cited

U.S. PATENT DOCUMENTS

| | | | |
|---|---|---|---|
| 4,139,462 | 2/1979 | Sample, Jr. | 175/66 |
| 4,209,381 | 6/1980 | Kelly, Jr. | 175/66 |
| 4,234,421 | 11/1980 | Dover, Jr. | 175/66 |
| 4,366,063 | 12/1982 | O'Connor | 210/747 |

OTHER PUBLICATIONS

European Patent Application 0005273; "Apparatus and Method for Removing Hydrocarbons from Drill Cuttings"; Nov. 1979.

*Primary Examiner*—Benoit Castel
*Attorney, Agent, or Firm*—Laney, Dougherty, Hessin & Beavers

[57] ABSTRACT

A method and system for dewatering a reserve pit at the drilling site of an oil or gas well. The pumpable waste sludge, including some bit cuttings, spent drilling mud, hydrocarbons and miscellaneous liquid wastes are first pumped from the pit into a holding tank. In the holding tank, sediments and solid particles are separated from the liquid content of the sludge. The liquid is then pumped into a high temperature boiler to separate the water, as steam, from salt and other water soluble solids and from heavy hydrocarbons. Separated solids are returned to the reserve pit. On completion of the process, the pit contains no unacceptable environmental contaminants and a minimal quantity of liquid. It is then earth filled to restore the topography to near its original condition. The apparatus employed in the invention includes a pump which is connected in a hose extending between the reserve pit and a holding tank. Another pump is connected between the holding tank and a boiler. Conveyor apparatus is provided for returning solids from the points of separation to the reserve pit.

3 Claims, 2 Drawing Figures

METHOD AND SYSTEM FOR DEWATERING RESERVE PITS

BACKGROUND OF THE INVENTION

1. Field of the Invention

A method and apparatus for treating a reserve pit and its contents to enable the pit to be earth filled more quickly and economically following a drilling operation.

2. Brief Description of the Prior Art

In the drilling of oil and gas wells, it is common practice to provide an earthen pit adjacent the drilling site to accommodate substantially all of the undesirable waste by-products of the drilling process. Such materials placed in the reserve pit include spent drilling mud from the shale shaker, bit cuttings from the well bore as contained in the spent drilling mud, both salt and fresh water, depending on the particular type of drilling being done and the location of the drilling, and various residual hydrocarbons and drilling mud additives.

With the heightened awakening of the national conscience toward environmental pollution and conservation of natural resources, state regulatory agencies have enacted regulations which more stringently than previously control the disposition of contaminants or waste materials generated in various industries, and the industry of oil and gas well drilling has been included in the concerns of such agencies. In the latter regard, it has become common practice to require, by such regulations, the refilling of reserve pits after the drilling of an oil or gas well has been completed. Since the reserve pit will frequently contain large quantities of sundry liquids and slurries developed in the course of the drilling operation, before the pit can be filled with earth these liquids must in some way be removed from the pit.

A practice which has been widely followed is to remove the liquids from the pit into tank trucks, and then transport the liquids to an approved disposal site, such as a disposal well drilled into an impermeable rock or underground cavity in such rock, so that the liquids thus do not freely migrate to ground water supplies and aquifers. The regulations relative to policing and filling of reserve pits generally impose a time limitation on the well operator and/or drilling contractor by which the reserve pit must be filled with earth. Since the liquid content of most pits will seldom evaporate within this time, and since drainage to surrounding lands or water sheds is generally neither feasible nor legal, the method of truck transport to adequate and approved disposal sites has been the most frequent method employed for removing the water content of the reserve pits to facilitate subsequent filling of the pit with earth in compliance with regulations.

It has unfortunately been a practice in preparing to satisfy the requirements for earth filling reserve pits for many truck operators to bootleg the waste liquids in the sense of making nocturnal dispositions of these wastes into streams, and at landfill locations not approved for such dumping, and constituting ecological hazards by reason thereof. Policing of disposition is difficult and the disinclination of well operators to adequately surveil the waste disposition activities of truckers is in part motivated by the expense attendant to legitimate and authorized disposition of such liquid wastes.

BRIEF DESCRIPTION OF THE PRESENT INVENTION

The present invention provides a method and apparatus for dewatering a reserve pit at the drilling site of an oil and gas well. The method can be easily practiced, and the equipment and personnel required render the described method of removing or reducing the liquid content of the pit much less expensive than legitimate methods of disposal previously in use.

Broadly described, the method of the invention comprises initially pumping the liquids from the pit into a holding tank. For this purpose, a centrifugal pump is preferably employed, driven by a water-cooled engine and utilizing a flexible conduit or hose which is extended to a location in the pit which is in close proximity to the interface between solids which have settled out in the pit and the liquid layer which stratifies in the upper portion of the pit.

As the liquid or semi-liquid content of the pit is pumped from the pit to the holding tank, it passes through filters or strainer screens so that relatively large solid particles are removed from the material thus transferred.

In the holding tank, finer particles and heavy sludge are permitted to settle from the water and these are ultimately removed from the holding tank back into the reserve pit.

From the holding tank, the liquid accumulated therein is pumped to a boiler. In the boiler, water and relatively light hydrocarbons are boiled away to leave a residue of fine, solid particles and salts previously dissolved in the water. These are intermittently removed from the boiler and returned to the reserve pit.

After the described procedure has been carried out for a period of time, a major portion or substantially all of the liquid content of the reserve pit is removed and the pit can be filled with earth to restore it and the surrounding landscape to an ecologically satisfactory status.

From the foregoing description of the invention it will be apparent that an important object of the invention is to provide a method of dewatering or removing the liquid from a reserve pit of the type used during the drilling of oil and gas wells without the necessity for transporting such liquids for extreme distances or to selectively available approved disposal locations.

Another object of the invention is to economically dewater reserve pits with equipment which can be set up and used quickly and easily alongside the reserve pit and without the necessity for complicated machinery or highly trained personnel.

Additional objects and advantages will become apparent as the following detailed description of the invention is read in conjunction with the accompanying drawings which illustrate a preferred embodiment of the invention.

GENERAL DESCRIPTION OF THE DRAWINGS

DETAILED DESCRIPTION OF A PREFERRED EMBODIMENT OF THE INVENTION

Figure 1:
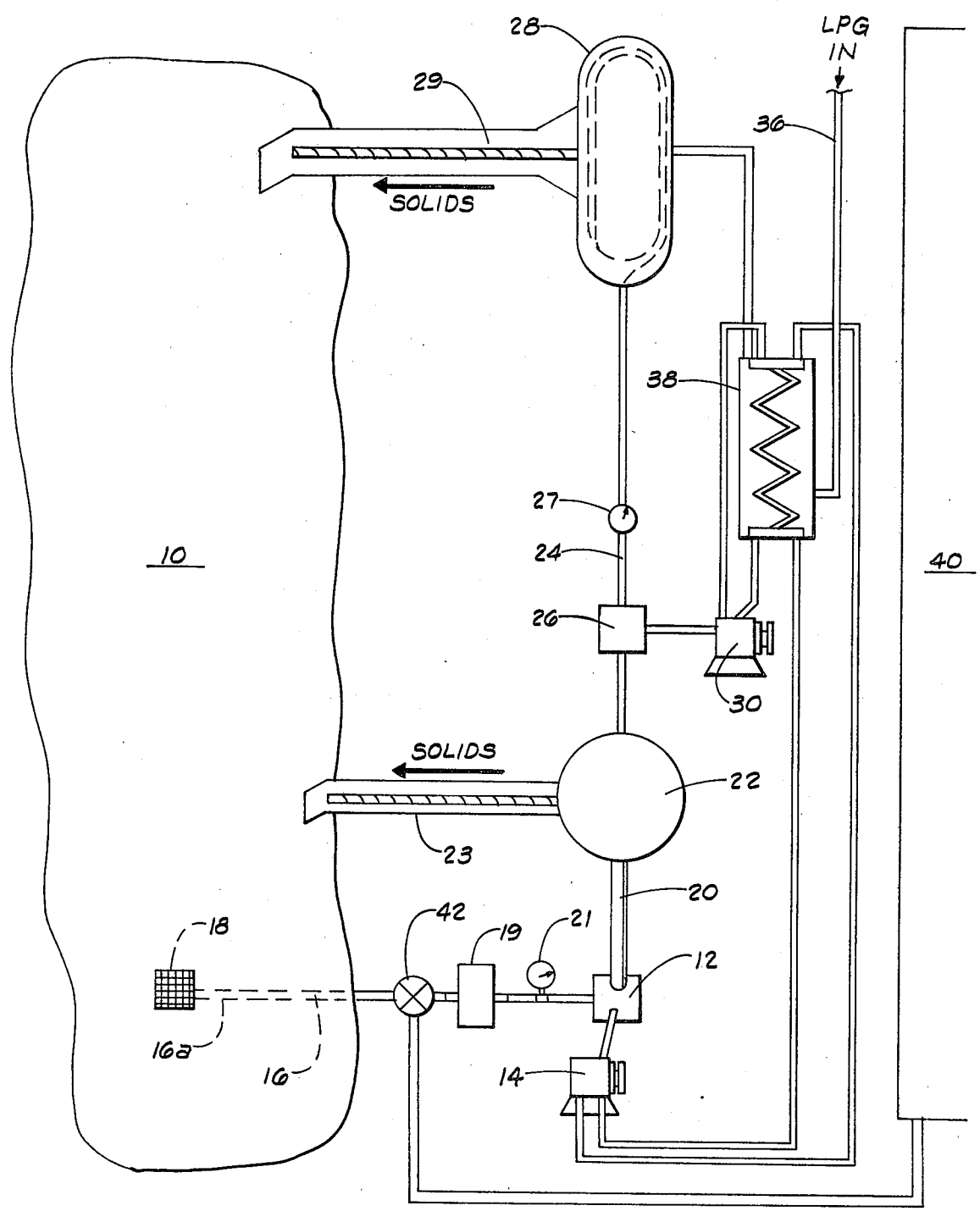
FIG. 1 is a plan view illustration of a reserve pit and of the apparatus used in the system of the present invention.
Figure 2:
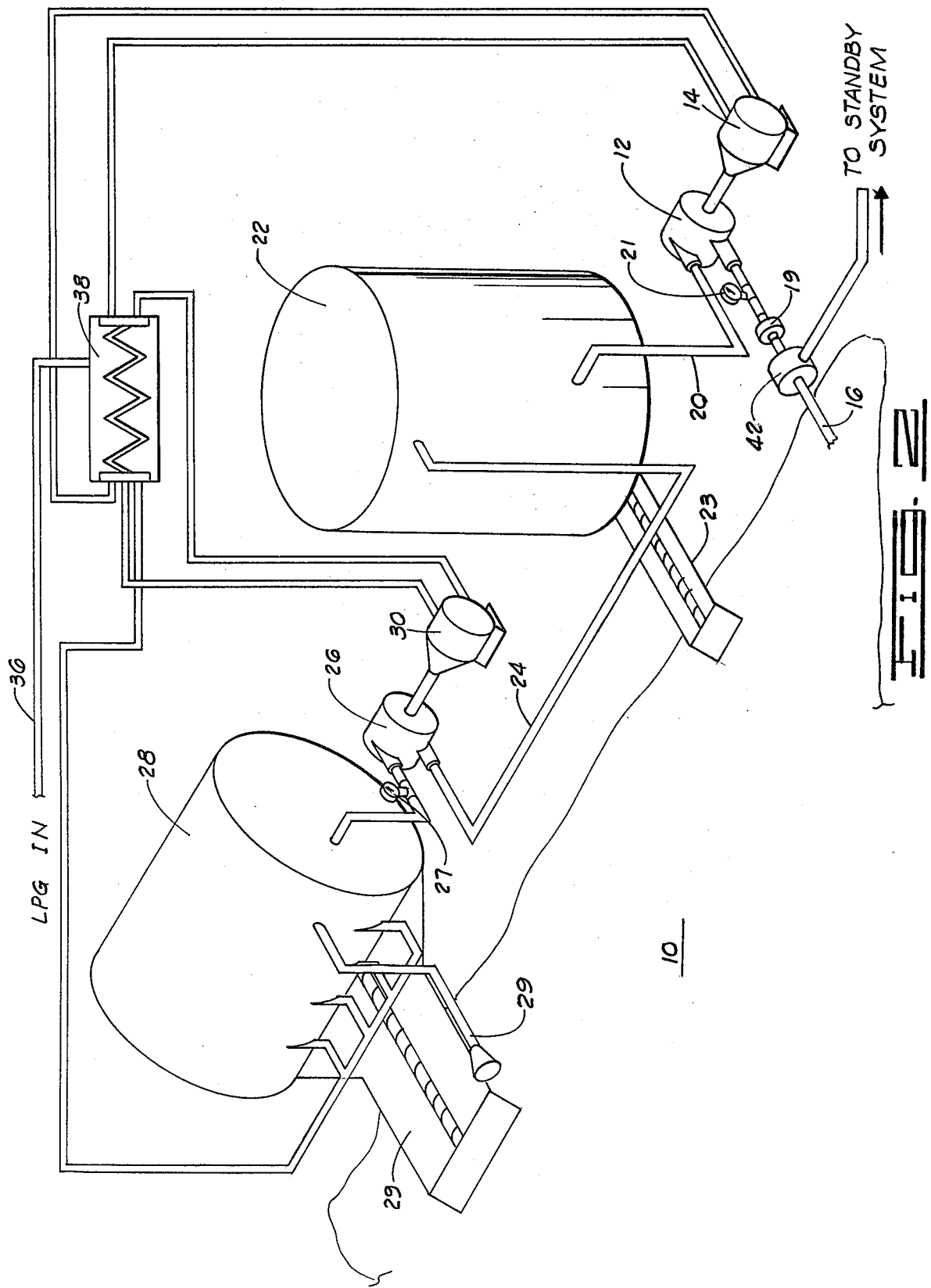
FIG. 2 is a schematic, perspective view of the principle components of the apparatus of the invention.

Referring to the drawing, a large open pit 10, commonly termed a reserve pit, is illustrated. During the drilling of a well for purposes of producing hydrocarbons, the bit cuttings, waste drilling mud, residual hydrocarbons, chemical additives and the like which constitute waste materials generated in the drilling process are discharged into the reserve pit. Frequently, quantities of variously polluted water will also be placed in the reserve pit, including brine having a high salt concentration. In all cases, a substantial quantity of contaminated liquid will be present in the pit.

The pollution and conservation authorities of most states regulate the handling of by-products of such drilling operations, and require that reserve pits be rendered environmentally innocuous following the drilling operation. Under such regulations, it is necessary that the reserve pit be earth filled within a limited period of time following completion of drilling. To accomplish this, it is a common practice to truck the liquid content of the pit to an approved disposal location so that bulldozers can fill the pit and accomplish the necessary land restoration.

The present invention provides an improved method for earth filling reserve pits, and apparatus facilitating the carrying out of the method. The pumpable contents of the pit are withdrawn by the use of a centrifugal pump 12, preferably having a capacity of about 200–400 g.p.m., which is driven by an engine 14, which is preferably an 8 hp propane powered engine. The pump 12 draws the liquid or semi-liquid contents from the pit 10 by means of a flexible suction hose 16 (preferably a 3-inch hose). The intake end 16a of the suction hose 16 is lowered into the liquids stratified in the upper portion of the reserve pit until it is within a few inches of the settled mud and other solids in the bottom of the pit. A relatively large mesh strainer screen 18 covers the intake end of the hose. A strainer screen filter 19 (preferably 80 mesh) is positioned in the hose 16 upstream from the pump 12.

The screen filter 19 is included in a short section of the hose 16, which short section can be quickly decoupled to facilitate cleaning the screen after it has become clogged. A flow meter 21 is located upstream from the pump 12 to monitor the rate of flow of liquid or slurry through the hose 16, and thus indicate continuously the state of cleanliness of the screen filter 19.

The pump 12 discharges the contents from the pit 10 via a discharge pipe 20 into a large holding tank 22. In the holding tank 22, small solid particles and entrained sediment from the liquid or semi-liquid contents of the pit are segregated by gravity separation. The separated solids materials removed by gravity from the liquid content of the pit 10 in the holding tank 22 can be withdrawn periodically from the bottom of the tank, neutralized and returned to the pit 10 by a conveyor 23, or carried to another approved point of disposition.

The liquids separated form the solids in the holding tank 22 are pumped by way of a flexible hose 24 (preferably a 2-inch hose) and centrifugal pump 26 to a boiler 28. A flow meter 27 is located in the hose 24 upstream from the boiler 28. The centrifugal pump 26 is preferably a 300 g.p.m. pump capable of developing 165 psi within the tubes of the boiler 28 as hereinafter explained. The pump 26 is driven by a propane powered engine 30.

In the boiler 28, the liquid from the pump 26 is preferably passed through 610 feet of coiled 2-inch pipe disposed in eight layers extending horizontally within the boiler 28. The boiler is provided with multiple rows of burners. The burners are preferably fueled by liquid petroleum gas. Propane is the most preferred fuel for the burners of the boilers. The burner fuel gas is supplied from a line 36.

By means of the boiler 28, the liquid from the reserve pit is vaporized. The liquid vaporized will be predominantly water, with a relatively small amount of light hydrocarbons. A small amount of heavy hydrocarbons occasionally present in the material charged to the boiler which will not be vaporized. A small amount of dissolved solids, which may be predominantly salt, is also left as a residue within the boiler tubes.

The residual solids left in the boiler 28 are periodically removed and returned to the reserve pit by means of the conveyor 29. This may be accomplished by shutting down the system, or by switching to an alternate standby system to facilitate removing solids from the boiler 28 and returning them to the pit periodically. Such standby system is hereinafter described.

The liquefied petroleum gas which is employed for firing the boiler 28 is preheated by passing the incoming gas through a heat exchanger 38 in heat exchange relation to cooling water employed for cooling the engines 14 and 30 used for driving the centrifugal pumps 12 and 26. This concurrently, of course, cools the coolant employed in the engines as it is recirculated in this fashion.

In order to facilitate continuous or semi-continuous operation, a standby system 40 illustrated diagramatically, but substantially identical to the system hereinbefore described, is provided to operate in parallel to the first described system. At such time as either of the flow meters 21 or 27 indicate a liquid flow rate therethrough which establishes that either the screen filter 19 is becoming excessively clogged, or the tubes of the boiler 28 are becoming fouled to the point of requiring cleaning, a valve 42 can be switched to divert liquid flow from the pit into the standby system 40. With the primary system thus isolated and out of service, the filter screen and boiler tubes thereof can be cleaned and restored to an operative service condition.

It will be perceived that the system described can be utilized for rapidly and efficiently "drying up" the reserve pit so that it can be filled in with earth to satisfy pollution and conservation regulations. The system and method employed will not completely dewater the pit since it will be apparent that the solids concentration of the liquid in the pit will increase as the liquid level decreases and the difficulty of separating the liquids from the solids will concomitantly increase. The system is effective, however, for rapidly reducing the liquid content of the pit to a point where filling the pit with earth can be immediately facilitated. In general, removal of the liquids from reserve pits, ranging in size from relatively small to large pits, can be accomplished in a period of from one to five days. The operation of the system is relatively inexpensive as compared to truck removal of the liquids from the pit, and this type of separation does not risk unacceptable contamination of certain areas due to surreptitious or clandestine disposition of the transported liquids.

Although various changes and innovations in the method and system described can be effected without departure from the basic principles of the invention, as such principles are made apparent from the foregoing description of a preferred embodiment of the invention, such changes and innovations are deemed to be within the spirit and scope of the invention except as the same may be necessarily limited by the appended claims or reasonable equivalents thereof.

What is claimed is:

1. A method of dewatering a reserve pit of the type used in drilling oil and gas wells comprising:
   pumping water and entrained solids from the pit to a holding tank;
   straining solid particles from the material pumped from the pit before the material reaches the holding tank;
   settling out solids from the liquid and solids pumped into the holding tank;
   pumping liquid from the holding tank to a boiler;
   boiling away liquid pumped into the boiler from the holding tank;
   returning to the reserve pit all solids separated from the material pumped from the reserve pit; and then filling the reserve pit with earth.

2. A method of dewatering a reserve pit as defined in claim 1 and further characterized as including the steps of:
   firing the boiler with a liquefied petroleum gas;
   driving pumps for pumping material from the reserve pit to the holding tank and from the holding tank to the boiler with water cooled engines; and
   exchanging heat between the liquefied petroleum gas and the water coolant for the engines to pre-heat the liquefied petroleum gas and cool the water.

3. A system for dewatering a reserve pit of the type used in drilling oil and gas wells comprising:
   a holding tank for settling solids from liquid;
   first conduit means connected to the holding tank and adapted to extend to and into the reserve pit;
   a first pump interconnected in the first conduit means for pumping liquids from the reserve pit via said first conduit means to the holding tank;
   filter means associated with said first conduit means for separating solids from liquids passing through said first conduit means from the reserve pit to the holding tank;
   a first engine drivingly connected to said first pump;
   a boiler;
   second conduit means interconnected between the holding tank and the boiler for conveying liquid from said holding tank to said boiler;
   a second pump interconnected in the second conduit means for pumping liquids from said holding tank via said second conduit means to said boiler;
   a second engine drivingly connected to said second pump;
   burner means for heating and firing said boiler;
   a source of liquefied petroleum gas for fueling said burner means;
   heat exchange means for exchanging heat between the liquefied petroleum gas used to fuel said burner means and a coolant used for cooling said engines employed for driving said pumps;
   first means for conveying solids from said holding tank to said reserve pit; and second means for conveying solids from said boiler to said reserve pit.

* * * * *